United States Patent [19]

Souza

[11] 4,257,541
[45] Mar. 24, 1981

[54] DISPENSING DEVICE FOR GRANULAR MATERIAL

[75] Inventor: David W. Souza, Fremont, Calif.

[73] Assignee: S J Marketing, Inc., Palo Alto, Calif.

[21] Appl. No.: 71,885

[22] Filed: Sep. 4, 1979

[51] Int. Cl.³ ............................................. G01F 11/24
[52] U.S. Cl. .................................................... 222/362
[58] Field of Search ................................ 222/362, 370

[56] References Cited

U.S. PATENT DOCUMENTS

| 1,656,980 | 1/1928 | Kronke | 222/362 X |
| 1,752,720 | 4/1930 | Bergelson | 222/362 X |
| 2,173,311 | 9/1939 | Oelgoetz | 222/362 X |
| 2,898,010 | 8/1959 | Tepper | 222/370 X |
| 3,129,853 | 4/1964 | Hoskins | 222/370 X |
| 3,327,905 | 6/1967 | Gould | 222/362 X |

FOREIGN PATENT DOCUMENTS

| 563520 | 9/1958 | Canada | 222/370 |
| 595071 | 3/1960 | Canada | 222/370 |

Primary Examiner—Charles A. Marmor
Attorney, Agent, or Firm—Harris Zimmerman; Howard Cohen

[57] ABSTRACT

A device for dispensing a measured quantity of granular material from a container includes a cap adapted to be secured to the open end of the container, and a generally cup-like housing secured to the interior surface of the cap. A dispensing member is disposed within the housing, and is adapted to be rotated about the axis of the cap and housing by a lever which extends outwardly from the cap. The dispensing member includes a cylindrical chamber extending therethrough parallel to the axis thereof, and adapted to be rotated to register with an intake port in the housing to be filled with granular material. The dispensing member may be rotated to bring the chamber into registration with a discharge port extending through the cap.

3 Claims, 8 Drawing Figures

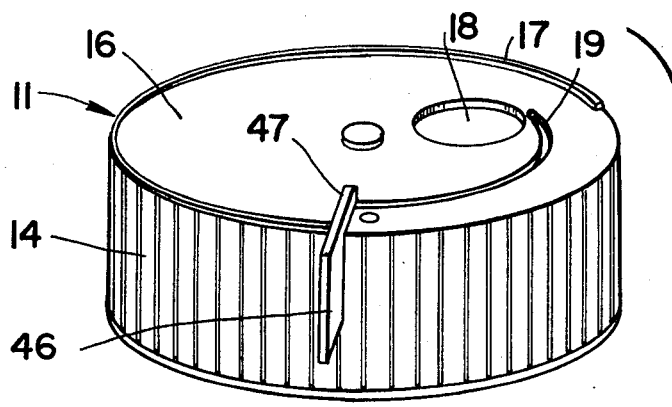
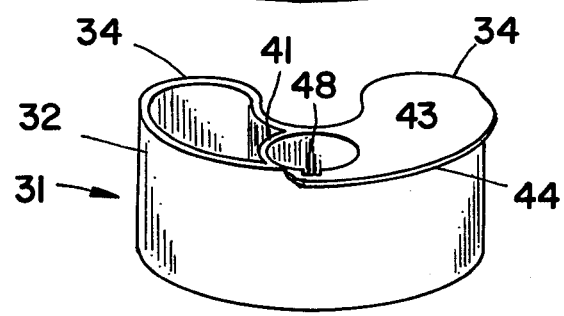
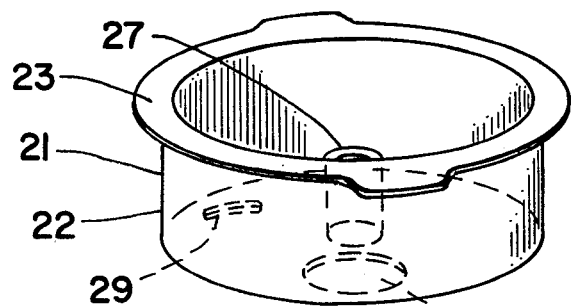
FIG_1
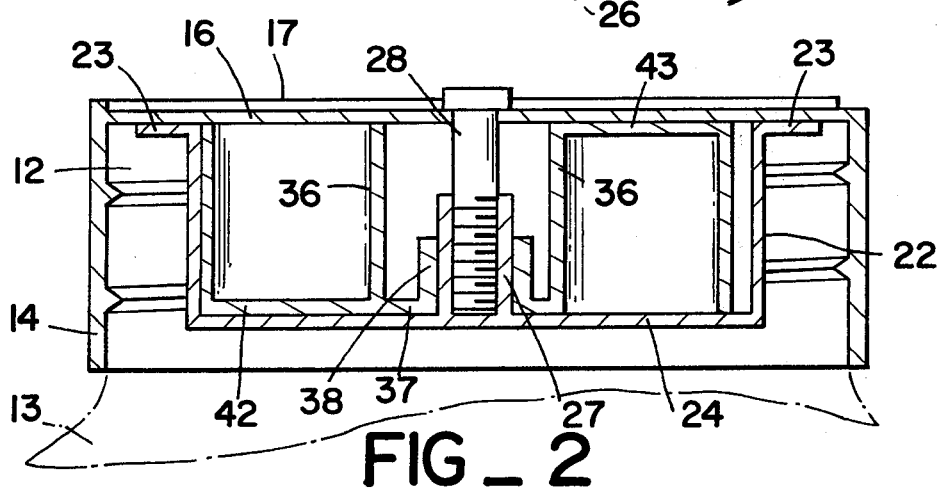
FIG_2

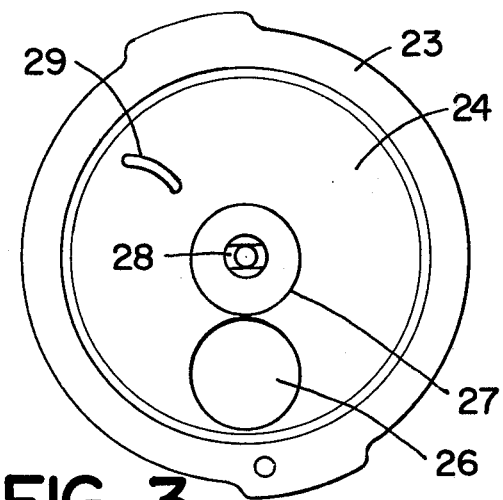
FIG_3
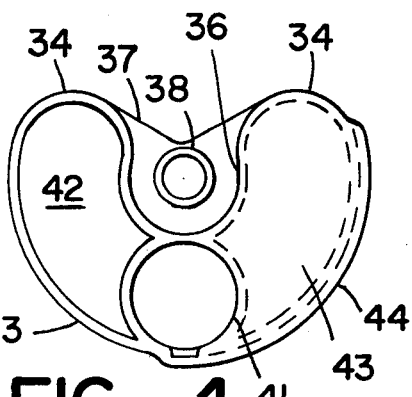
FIG_4
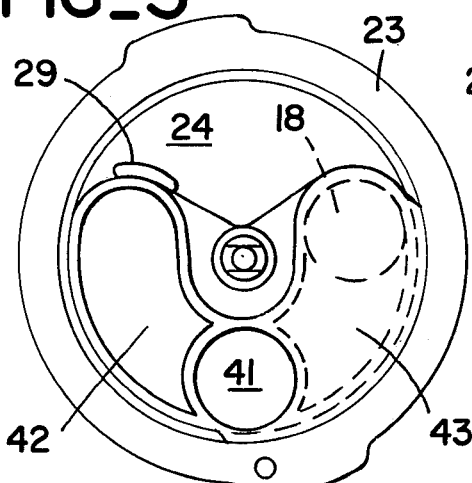
FIG_5
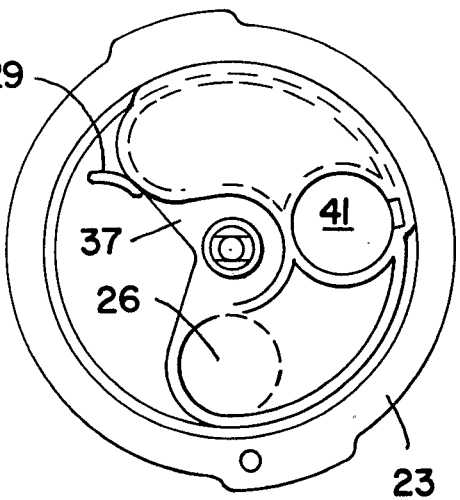
FIG_6
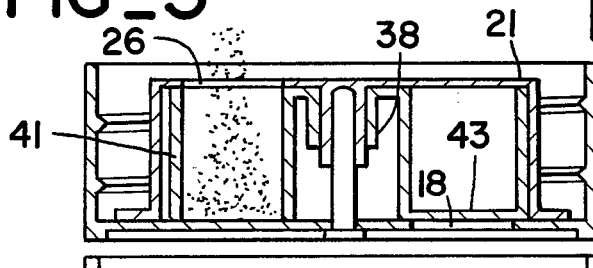
FIG_7
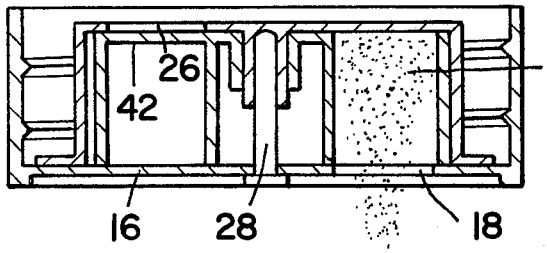
FIG_8

DISPENSING DEVICE FOR GRANULAR MATERIAL

BACKGROUND OF THE INVENTION

Many granular comestible products, such as instant beverage mixes, are sold in jars which are closed by threaded caps. The quality of the granular comestible product deteriorates rapidly upon exposure to air, due in part to the large surface area of the granular composition. Thus, many instant beverage products are packed using an inner seal to exclude any contact with ambient air during shipping and marketing.

However, the inner seal must be removed to make use of the product; thereafter, the jar cap must be relied upon to preserve the freshness and flavor of the product. Ironically, the cap must be removed from the jar each time it is desired to use the product. Unscrewing and resecuring the jar top is a minor inconvenience to the user of the product, but repeated opening of the jar exposes the contents to large amounts of oxygen laden ambient air. For example, a large jar of instant coffee may be opened and resealed as many as two hundred times before the contents of the jar are completely used. Renewing the oxygen supply of the air within the jar two hundred times causes a serious deterioration in the flavor, aroma, and freshness of the product.

SUMMARY OF THE PRESENT INVENTION

The present invention generally comprises a dispensing device for granular materials which are stored in a jar or similar container. The dispensing device is incorporated into the cap or lid which is secured about the opening of the container. The device facilitates dispensing the granular material by inverting the container, dispensing the granular material into the desired receptacle, and thereafter righting the container.

The most salient feature of the present invention is that the granular material may be dispensed from the container without requiring removal of the cap or lid of the container to gain access to the contents therein. Thus, the deterioration in the quality of comestible granular substances such as instant beverages is alleviated. In addition, the present invention provides a method for using the granular substance in the container which is far more convenient than the well-known steps of removing the cap or lid, withdrawing the desired amount of the granular substance from the container, and thereafter replacing the cap or lid.

The dispensing device of the present invention includes a cap or lid which is adapted to be secured to the opening of the container of the granular substance. The cap includes a generally cylindrical side wall and an end wall secured to the upper edge of the side wall. A generally cup-like housing is disposed within the cap and is secured to the interior surface of the end wall thereof. The housing is sufficiently small in diameter to be received within the inner diameter of the opening of the container. The housing includes a generally cylindrical side wall and an end panel joined to the lower edge of the side wall. The end panel of the housing includes an intake port while the end wall of the cap includes a discharge port.

A dispensing member is disposed within the housing, and is adapted to rotate about the common axis of the housing and cap. The dispensing member includes a generally cylindrical chamber extending parallel to the common axis of the housing and cap. The dispensing member is rotatable so that the chamber may be rotated between registration with the intake port in the end panel and registration with the discharge port in the end wall of the cap.

The end wall of the cap is also provided with an annular slot through which an external actuating lever is secured to the dispensing member. The dispensing device is operated by first inverting the container and then actuating the lever to move the chamber of the dispensing member from alignment with the intake port to alignment with the discharge port. During the time that the chamber is aligned with the intake port, it is filled with granular material which flows therein gravitally. When the chamber is moved into registration with the discharge port, the charge of granular material contained in the chamber is discharged through the discharge port, also by the force of gravity. The lever is then returned to the initial position in which the chamber is aligned with the intake port. The dispensing member includes panel portions which occlude the intake port when it is not in registration with the chamber, and other panel portions which occlude the discharge port when it is not in registration with the chamber. Thus, there is no direct path from the air space within the container to ambient air. As a result, the exposure of the granular material in the container to oxygen-laden air is reduced to an absolute minimum, and the freshness of the granular material is retained.

A BRIEF DESCRIPTION OF THE DRAWING

FIG. 1 is an exploded view of the assembly of the dispensing device of the present invention.

FIG. 2 is a cross-sectional elevation of the dispensing device of the present invention.

FIG. 3 is a plan view of the housing of the present invention.

FIG. 4 is a plan view of the dispensing member of the present invention.

FIG. 5 is a plan view of the dispensing member-housing assembly, shown in the intake disposition.

FIG. 6 is a plan view of the assembly of FIG. 5, shown in the discharge position.

FIG. 7 is a cross-sectional view of the present invention, shown in the intake position.

FIG. 8 is a cross-sectional view of the present invention, shown in the discharge position.

DESCRIPTION OF THE PREFERRED EMBODIMENT

The present invention generally comprises a dispensing device which is adapted to serve as the closure member of the opening of a jar or similar container. The dispensing device is particularly adapted for use with granular comestible substances, such as instant beverage products and the like. However, although the preferred embodiment will be described with reference to these substances, the invention is not limited to such use.

As shown in FIG. 1, the dispensing device includes a cap 11 which is adapted to be secured to the neck 12 of a jar or similar container 13. The cap 11 includes a generally cylindrical side wall 14 which is depicted in FIG. 2 as being provided with internal threaded portions to engage external threaded portions about the neck 12 of the container. It may be appreciated, however, that the internal surface of the side wall 14 could be provided with snap acting surfaces or members to engage cooperatively similar members formed about the neck 12. The external surface of the side wall 14 may be provided with a roughened texture to facilitate manual grasping thereof.

The cap 11 also includes an upper end wall 16 which is joined integrally to the upper edge of the side wall 14. A lip 17 extends upwardly from the end wall 16 and circumscribes in annular fashion approximately three quarters of the end wall. A generally circular discharge port 18 extends through the end wall 16, and is spaced radially from the center thereof. The end wall also includes an arcuate slot 19 extending therethrough, the slot being disposed at a constant radial distance from the center of the end wall. It may be noted that the slot 19 is spaced radially inwardly from the periphery of the portion of the end wall which does not include the lip 17.

The dispensing device also includes a generally cup-like housing 21 which is received within the cap 11 and which is disposed coaxially therewith. The housing 21 includes a generally cylindrical side wall 22, and a flange 23 extending radially outwardly from the upper edge of the side wall 22. The flange 23 impinges on and is secured to the inner surface of the end wall 16, by adhesive means, ultrasonic welding, or the like. The housing 21 also includes an end panel 24 which is joined integrally with the lower edge of the side wall 22. It may be appreciated that the diameter of the side wall 22 is sufficiently small to provide clearance within the neck 12 of the container 13.

With reference to FIG. 3, the end panel 24 include a generally circular intake port 26 extending therethrough and spaced between the side wall 14 and the center of the end panel 24. A central post 27 extends upwardly from the inner surface of the end panel 24, and is disposed coaxially with respect to the side wall 22. The post 27 is provided with a threaded bore to receive and secure a screw 28 which extends axially through the end wall 16, as shown in FIG. 2. Also extending upwardly from the inner surface of the end panel 24 is a stop lug 29, as shown in FIGS. 1 and 3.

The present invention also includes a dispensing member 31 which is received within the confines of the side wall 22 of the housing 21. The dispensing member 31 includes a side wall 32 having a portion 33 which is generally cylindrical in configuration and which subtends an angle slightly greater than 180°. The side wall 32 also includes portions 34 which curve inwardly from the ends of the portion 33 in generally circular arcs, as shown in FIG. 4. The portions 34 of the side wall 32 join a U-shaped portion 36 of the side wall which is concentric about the axis of the side wall 22 of the housing. The diameter of the portion 33 of the side wall is slightly less than the inner diameter of the side wall 22 of the housing, and is dimensioned to provide a sliding fit therein.

The housing 31 includes a web portion 37 which spans the lower edge of the U-shaped portion 36 of the side-wall 32. A cylindrical tubular member 38 extends upwardly from the web 37 concentrically about the axis of the assembly, and is received about the post 27 of the housing 21 in rotatable fashion.

The dispensing member 31 includes a tubular cylindrical member 41 extending parallel to the axis of the assembly and secured between the portion 36 and the portion 33 of the side wall 31, as shown in FIG. 4. The tubular member 41 is open at both ends, and is disposed equidistant from the portions 34 of the side wall 32.

The dispensing member 31 also includes a pair of lateral panels 42 and 43. The lateral panel 42 extends continuously between the lower edges of the side wall portions 33, 34, and 36, as well as the adjacent lower edge of the tubular member 41. The lateral panel 43 extends continuously between the upper edges of the opposed side of the dispensing member; i.e., between the upper edges of the side wall portions 33, 34, and 36, as well as the adjacent upper edge portion of the tubular member 41. In addition, the lateral panel 43 extends slightly radially outwardly of the side wall portion 33 to form a flange 44 extending outwardly from the upper edge of the dispensing member 31.

The dispensing device also includes a tabular lever member 46 which is disposed adjacent to the exterior surface of the side wall 14 of the cap 11. The tabular lever 46 includes an arm 47 which extends radially inwardly and also downwardly through the slot 19 in the end wall 16. The inner end of the arm 47 is received in a slot 48 in the upper surface of the dispensing member, adjacent to the tubular member 41.

The tabular lever 46 may be urged manually to translate about the periphery of the cap 11, with the distal ends of the lip 17 acting as stops to limit the travel thereof. It may be appreciated that the dispensing member 31 will be rotated about the axis of the device in concert with the tabular lever 46.

The lever 46 is normally in the position shown in FIG. 1, abutting one end of the lip 17 of the cap. To use the dispensing device of the present invention, the jar or container is inverted so that the contents thereof are disposed above the dispensing device. With the lever shown in the position of FIG. 1, the dispensing member 31 abuts the stop lug 29, as shown in FIG. 5. In this position the tubular member 41 is aligned with the intake port 26 in the housing. The granular material (or powdered material or the like) in the container is caused to flow by the force of gravity into the chamber of the tubular member 41, as shown in FIG. 7. It may be appreciated that the tubular member 41 is dimensioned so that the chamber therein defines a volume which is convenient to be dispensed; i.e., one teaspoon, or the like.

At the same time, a portion of the lateral panel 43 is disposed adjacent to the discharge port 18, so that the discharge port 18 is completely occluded by the lateral panel 43. The lateral panel 43 thus prevents air flow into the dispensing device and into the container.

With the container still in the inverted position, the tabular lever 46 is manually urged to translate about the periphery of the cap, causing the dispensing member 31 to rotate to the position shown in FIG. 6. As the tubular member 41 is moved away from registration with the intake port 26, the lateral panel 42 of the dispensing member occludes the intake port 26 to prevent the gravital flow of the granular material through the intake port. When the tabular lever 46 has traversed the entirety of the slot 19, it impinges on the other end of the lip 19 as the tubular member 41 is brought into registration with the discharge port 18, as shown in FIG. 8. The granular material contained in the chamber of the tubular member 41 is caused by the force of gravity to be discharged downwardly through the discharge port 18 into any desired container. During the entire rotation of the dispensing member 31 from the initial intake position to the dispensing position, the intake port 26 is completely occluded by the lateral panel 42. After the charge of granular material is released through the discharge port 18, the lever 46 may be returned to the initial position shown in FIG. 1, so that the dispensing procedure may be reiterated. Alternatively, the container may be reinverted to its upright position, and the lever 46 then returned to the initial intake position to await the next dispensing procedure.

It may be appreciated that the dispensing device may be provided with a spring member to resiliently urge the tabular lever 46 and the dispensing member 31 to automatically return to the initial fill position of FIG. 1, FIG. 5, and FIG. 7.

It should be emphasized that the dispensing device of the present invention provides a quick and convenient means of dispensing granular or powdered material from a container without requiring removal of the lid or cap of the container. At the same time, the device prevents airflow into the container in any substantial amount, except for the air required to replace the material dispensed from the container. Thus the freshness of the contents of the container may be preserved by excluding substantial contact with oxygen-laden air. Furthermore, it may be noted that the dispensing device of the present invention has the same general size and shape of many jar or container caps known in the prior art, and thus does not reduce the capacity of the jar or container.

I claim:

1. A dispensing device for use with a container having an opening, comprising; a cap member adapted to be secured to said container in abutting, sealing relationship to said opening, said cap member including an end wall having a discharge port therethrough; a generally cup-like housing secured to the inner surface of said cap member and having an open upper end joined to said inner surface of said wall, said housing being disposed entirely within said container; an intake port extending through the bottom end panel of said housing and non-aligned with respect to said discharge port; a dispensing member disposed within said housing and rotatably supported therein, said dispensing member including a continuous curved side wall having a first cylindrical portion spaced slightly inwardly of said housing and a second curved portion disposed concentrically within said first portion and joined thereto end-to-end to define a two lobed, kidney shaped structure; a dispensing chamber open at upper and lower ends and disposed medially of said two lobes and between said first and second portions of said side wall; a first lateral panel secured to the lower edge of one of said lobes; a second lateral panel secured to the upper edge of the other lobe; means for rotating said dispensing member from a first position in which said chamber is aligned with said intake port and said second lateral panel occludes said discharge port to a second position in which said chamber is aligned with said discharge port and said first lateral panel occludes said intake port, said last mentioned means including an arcuate slot extending through said end wall of said cap member, an arm extending through said slot and secured to said upper edge of said side wall, and a tabular member extending from the distal end of said arm and disposed radially outwardly of said cap member; first stop means associated with said arm for limiting rotation of said dispensing member, and second stop means associated with said bottom panel for limiting rotation of said dispensing member.

2. The dispensing device of claim 1, wherein said first stop means includes a lip extending upwardly from the outer edge of said cap member and extending partially thereabout, said arm being disposed between opposed ends of said lip and impinging thereon to limit the rotational excursion of said arm and said dispensing member.

3. The dispensing device of claim 1, wherein said second stop means includes lug means extending upwardly from said inner surface of said bottom panel and disposed to impinge on said dispensing member to limit the rotational excursion thereof.

* * * * *